A. VUILLIER.
Vegetable-Slicer.
No. 159,869. Patented Feb. 16, 1875.
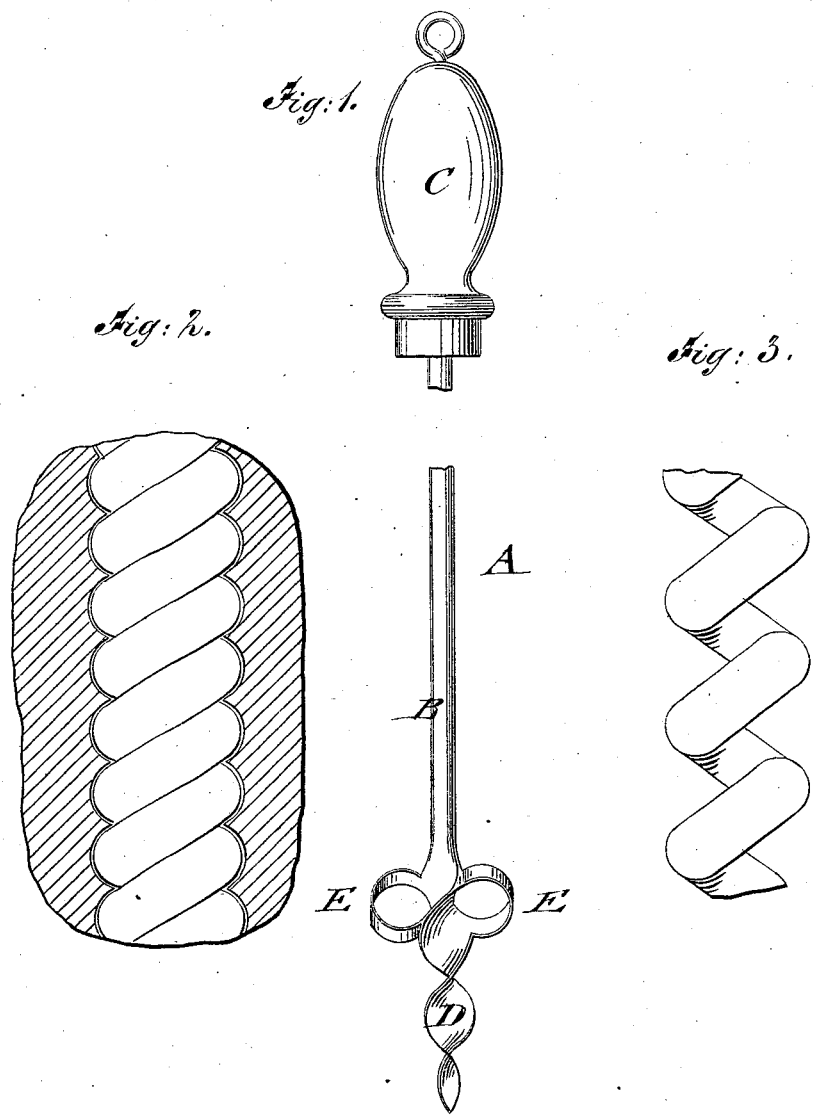

UNITED STATES PATENT OFFICE.

AIMÉ VUILLIER, OF NEWARK, NEW JERSEY.

IMPROVEMENT IN VEGETABLE-SLICERS.

Specification forming part of Letters Patent No. 159,869, dated February 16, 1875; application filed October 17, 1874.

*To all whom it may concern:*

Be it known that I, AIMÉ VUILLIER, of Newark, in the county of Essex and State of New Jersey, have invented a new and Improved Spiral Slicing Device, of which the following is a specification:

In the accompanying drawing, Figure 1 represents a side elevation of my improved implement for cutting potatoes and similar vegetables into spiral slices; and Figs. 2 and 3, respectively, show the mode of cutting the slices from the vegetable, and also a side view of a detached spiral slice.

Similar letters of reference indicate corresponding parts.

My invention relates to a device or implement for cutting or slicing potatoes, turnips, red beets, and similar vegetables for culinary purposes, and for ornamenting therewith in a novel and effective manner. The invention consists of an implement having a spiral cutting-blade, with side-extending cutting-rings at the upper end, for entering the vegetable and slicing out of the same a twist of two separated spiral pieces.

In the drawing, A represents the implement or slicing device, which consists of a rod, B, of suitable strength, set by preference detachably into a square socket of the handle C. The lower end of rod B terminates in a spiral cutting-blade, D, which has attached in suitable manner at the upper part thereof two side-extending cutting-rings, E, as shown in Fig. 1, being placed under suitable but opposite angle of inclination to the rod C, so as to form a continuous extension to the spiral guide-cutter in the shape of a twisted "8." The spiral guide-cutter D is screwed into the raw potato, beet, or other vegetable, preparing the way for the cutting-rings, which core or slice out, in connection with the guide-cutter, a twist-shaped portion, composed of two equal spiral parts, that may be readily separated by screwing one out of the other. The cutter-rod is then detached from the handle and drawn centrally through the twist, as this may be accomplished in a more rapid and convenient manner than the returning of the cutter parts by screwing backward through the twist. In this manner spiral potato-slices for frying, and other vegetable slices for ornamentation and pickling, especially by combining spirals of different colors, as turnip and red beet, are produced, which will meet with ready favor in the various culinary applications.

Having thus described my invention, I claim as new and desire to secure by Letters Patent—

The rod B, having, at the lower end, a double-twist bit, D, provided with two spiral concavities, each leading to one of the ring-cutters E E, as and for the purpose specified.

AIMÉ VUILLIER.

Witnesses:
PAUL GOEPEL,
T. B. MOSHER.